United States Patent
Jackson et al.

(10) Patent No.: US 7,064,848 B2
(45) Date of Patent: Jun. 20, 2006

(54) SYSTEM AND METHOD FOR CONVERTING PRINT JOBS STORED IN PRINTSHOP JOB DESCRIPTION LANGUAGE FILES INTO PRINTSHOP WORKFLOW

(75) Inventors: Warren B. Jackson, San Francisco, CA (US); Sudhendu Rai, Fairport, NY (US)

(73) Assignee: Xerox Corporation, Stamford, CT (US)

(*) Notice: Subject to any disclaimer, the term of this patent is extended or adjusted under 35 U.S.C. 154(b) by 951 days.

(21) Appl. No.: 09/735,167

(22) Filed: Dec. 12, 2000

(65) Prior Publication Data

US 2002/0071134 A1    Jun. 13, 2002

(51) Int. Cl.
G06F 15/00    (2006.01)
G06F 19/00    (2006.01)

(52) U.S. Cl. .................... 358/1.13; 358/1.15; 700/100; 700/99

(58) Field of Classification Search ...... 358/1.12–1.15, 358/1.13; 364/518–521, 468, 403; 345/740, 345/736, 733, 771; 707/10, 102–103; 700/99–100, 700/101, 102; 705/7
See application file for complete search history.

(56) References Cited

U.S. PATENT DOCUMENTS

| | | | |
|---|---|---|---|
| 4,839,829 A * | 6/1989 | Freedman | 345/751 |
| 4,887,218 A | 12/1989 | Natarajan | 700/102 |
| 4,896,269 A | 1/1990 | Tong | 700/101 |
| 4,956,784 A | 9/1990 | Hadavi et al. | 700/102 |
| 4,974,166 A | 11/1990 | Maney et al. | 700/113 |
| 5,093,794 A | 3/1992 | Howie et al. | 700/100 |
| 5,229,948 A | 7/1993 | Wei et al. | 700/99 |
| 5,918,226 A | 6/1999 | Tarumi et al. | 707/10 |
| 5,946,661 A | 8/1999 | Rothschild et al. | 705/7 |
| 6,263,253 B1 | 7/2001 | Yang et al. | 700/99 |
| 6,278,901 B1 | 8/2001 | Winner et al. | 700/99 |
| 6,348,971 B1 | 2/2002 | Owa et al. | |
| 6,509,974 B1 * | 1/2003 | Hansen | 358/1.12 |
| 6,546,364 B1 | 4/2003 | Smirnov et al. | |
| 6,633,790 B1 | 10/2003 | Garstein | 700/99 |
| 6,728,947 B1 | 4/2004 | Bengston | |
| 6,805,502 B1 | 10/2004 | Rai et al. | 400/61 |
| 2002/0101604 A1 | 8/2002 | Mima et al. | |

OTHER PUBLICATIONS

Rai, Sudhendu, Xerox Corporation, *Print Shops as Document Factories, The Future of Manufacturing: New Developments in Technology and System Design*; Massachusetts Institute of Technology; Power Point Presentation, Apr. 19, 2000, pp. 1-18.

(Continued)

*Primary Examiner*—King Y. Poon
(74) *Attorney, Agent, or Firm*—Fay, Sharpe, Fagan, Minnich & McKee, LLP

(57) ABSTRACT

A method for automatically converting print jobs stored in printshop job description language (PSDL) files into workflow for a specific printshop is disclosed. A print job stored in a PSDL file is extracted from the PSDL file and used to generate a proposed workflow and accompanying job cost estimate. The workflow generated by the illustrated embodiment merges the job resource requirements of the print job with the resource and material availability of the printshop. The generated workflow and an accompanying job cost estimate for producing the workflow in the printshop are transmitted to the original job submitter for approval prior to beginning the printing process. Alternately, the job submitter is capable of submitting the print job in PSDL format to a printshop via the Internet.

15 Claims, 4 Drawing Sheets

OTHER PUBLICATIONS

Gershwin, Stanley and Rai, Sudhendu, *Application and Extension of Manufacturing Systems Engineering Techniques to Print Shops*; Dept. of Mechanical Engineering, Massachusetts Institute of Technology, and Wilson Center for Research Technology, Xerox Corporation; Power Point Presentation; Sep. 29, 1999, pp. 1-15.

Gershwin, Stanley B., *Manufacturing Systems Engineering*, Prentice-Hall, 1994.

*Cellular Manufacturing: One-Piece Flow for Workteams*, ISBN: 156327213X, Productivity Press Inc.; Apr. 1999.

Wu, N., *A Concurrent Approach to Cell Formation and Assignment of Identical Machines in Group Technology*, Int. J. Prod.. Res., 1998, vol. 36, No. 8, 2099-2114; Science Center, Shantou University, Shantou 515063, China.

Luqi et al., "A Prototyping Language for Real-Time Software." *IEEE Transactions on Software Engineering*, vol. 14, No. 10, Oct. 1988, pp. 1409-1423.

Hopp, Wallace J. and Spearman, Mark L., *Factory Physics: Foundations of Manufacturing Management*. McGraw-Hill Professional Book Group, Boston, Massachusetts. ISBN: 0-256-15464-3; pp. 153-156; 323-325; 462-485 (Sep. 1995).

*ADF or LDF? Introducing the Lean Document Factory I*, Xerox Corporation, Power Point Presentation, Nov. 4, 1999.

*ADF or LDF? Introducing the Lean Document Factory II*, Xerox Corporation, Power Point Presentation, Nov. 4, 1999.

U.S. Appl. No. 09/706,430, filed Nov. 3, 2000, Rai et al.

U.S. Appl. No. 09/706,078, filed Nov. 3, 2000, Squires et al.

* cited by examiner

SYSTEM AND METHOD FOR CONVERTING PRINT JOBS STORED IN PRINTSHOP JOB DESCRIPTION LANGUAGE FILES INTO PRINTSHOP WORKFLOW

FIELD OF THE INVENTION

The present invention relates generally to printshop workflow and more specifically to the conversion of print jobs stored in a printshop job description language file into workflow for individual printshops.

BACKGROUND OF THE INVENTION

Printshops convert printing orders, also known as print jobs, into finished printed material. Conventional methods have required the submission of a print job to a printshop where a store employee provides an estimated price and time of delivery based on the type and size of the work order. Conventional methods have stressed the breaking of the print job down into component parts with the processing of each part of the print job occurring only following the completion of the previous part of the print job.

Recent developments in the field of printing have seen emerging standards for printshop independent job description languages (PSDL). These PSDL file formats allow the specification of a job in a printshop independent manner with the details of the job, such as operations to be performed, resources required, and the actual data content of the job, included in the file. One of these PSDL formats, PPF (Print Production Format), was developed by the CIP3 consortium, the International Cooperation for Integration of Prepress, Press and Postpress to provide a data packet that can be read by any CIP3 compliant vendor. Other examples of PSDL formats are the JDF, and PCX file formats. Once received by the printshop, the print job must be extracted from the PSDL file and a plan for work generated (work flow).

SUMMARY OF THE INVENTION

The illustrated embodiment of the present invention converts a print job stored in a PSDL file, into workflow for an individual printshop. The workflow is a set of instructions detailing the sequence of operations and required resources necessary to complete a print job. The illustrated embodiment of the present invention allows the conversion to be performed automatically. The workflow that is generated by the illustrated embodiment is based on knowledge of the available resources and job costs in the printshop. The conversion process produces a workflow, a schedule with estimated completion times, and a job cost estimate that are transmitted to a job submitter for approval. The job submitter may be either a human or a machine. In the event the workflow and/or the schedule as presented to the job submitter proposes the use of inadequate resources, inappropriate completion dates, or contains an unacceptable cost estimate, the illustrated embodiment provides the ability for the job submitter to substitute resources so as to adjust the proposed workflow and schedule and generate a new job cost estimate.

In one embodiment of the present invention, a print job stored in a PSDL file is submitted by a job submitter to a printshop. A PSDL parser extracts the print job requirements from the PSDL file. The material and labor requirements for the parsed print job are compared against the available resources in the printshop to generate a list of required materials, a proposed workflow, schedule and an estimated job cost that is tailored to the printshop. The workflow, schedule and job cost estimate for the print job (as specified by the workflow) are transmitted to the job submitter for approval. The job submitter may accept the proposed workflow, schedule and job cost estimate as is, in which case the print job is sent to the print queue for printing. Alternatively, the job submitter may substitute materials and have a new workflow, schedule and a new job cost estimate generated.

In accordance with another aspect of the present invention, a print job is stored in a PSDL file and then submitted to a printshop. After the print job requirements have been extracted from the PSDL file, the material and labor requirements of the print job are compared against the available resources, status of work-in-progress, current schedule and materials in the printshop. A proposed workflow, schedule and job cost estimate tailored to the printshop are generated. The workflow incorporates the concept of organizing the printshop into a set of autonomous cells and mapping jobs to one or more of these autonomous cells. Within each cell, the jobs are further sub-divided into sub-jobs and processed according to a well-defined job-flow control policy. The control policy or real-time job-scheduling invokes a pull-type control rule wherein the downstream process in the workflow authorizes/signals upstream process to start or stop processing jobs and sub-jobs. It may also a invoke push-type control policy whereby jobs and signals flow from upstream to downstream processes with inter-process buffers to regulate job-flow. Or the control-policy can comprise rules that combine the pull-type and push-type control policies. Inter-process buffer size to store work-in-progress (WIP) is specified and monitored. Other requirements such as available production time, time to process each step of the production process are also estimated and used to generate the workflow. The workflow, in conjunction with the control-policy, ensures that jobs keep flowing through the shop even as disruptive events such as random machine failures, operator absence, job specification errors and the like happen.

Another aspect of the present invention enables a job submitter to submit a print job stored in a PSDL file to a printshop over a network, in one such instance the network is the Internet. A PSDL parser at the printshop extracts the print job requirements from the PSDL file and a proposed workflow for the printshop is generated along with a job cost estimate and schedule for the print job. The proposed workflow, schedule and job cost estimate are transmitted over the Internet to the job submitter. The job submitter can either indicate acceptance of the print job or the job submitter can vary the job requirements so as to require the generation of a new proposed workflow, schedule and new job cost estimate.

DETAILED DESCRIPTION OF THE INVENTION

The illustrated embodiment of the present invention provides a method for automatically converting a PSDL stored print job into workflow for a specific printshop. The print job stored in a PSDL file is extracted from the PSDL file and used to generate a proposed workflow and an accompanying job cost estimate. The workflow generated by the illustrated embodiment merges the job resource requirements of the print job with the resource (including labor, equipment, fonts etc.) and material availability of the printshop. The generated workflow, schedule and an accompanying job cost estimate for producing the workflow in the printshop are transmitted to the original job submitter for approval prior to beginning the printing process. Alternately, the job submitter is capable of submitting the print job in PSDL format to a printshop over the Internet from a remote location.

Figure 1:
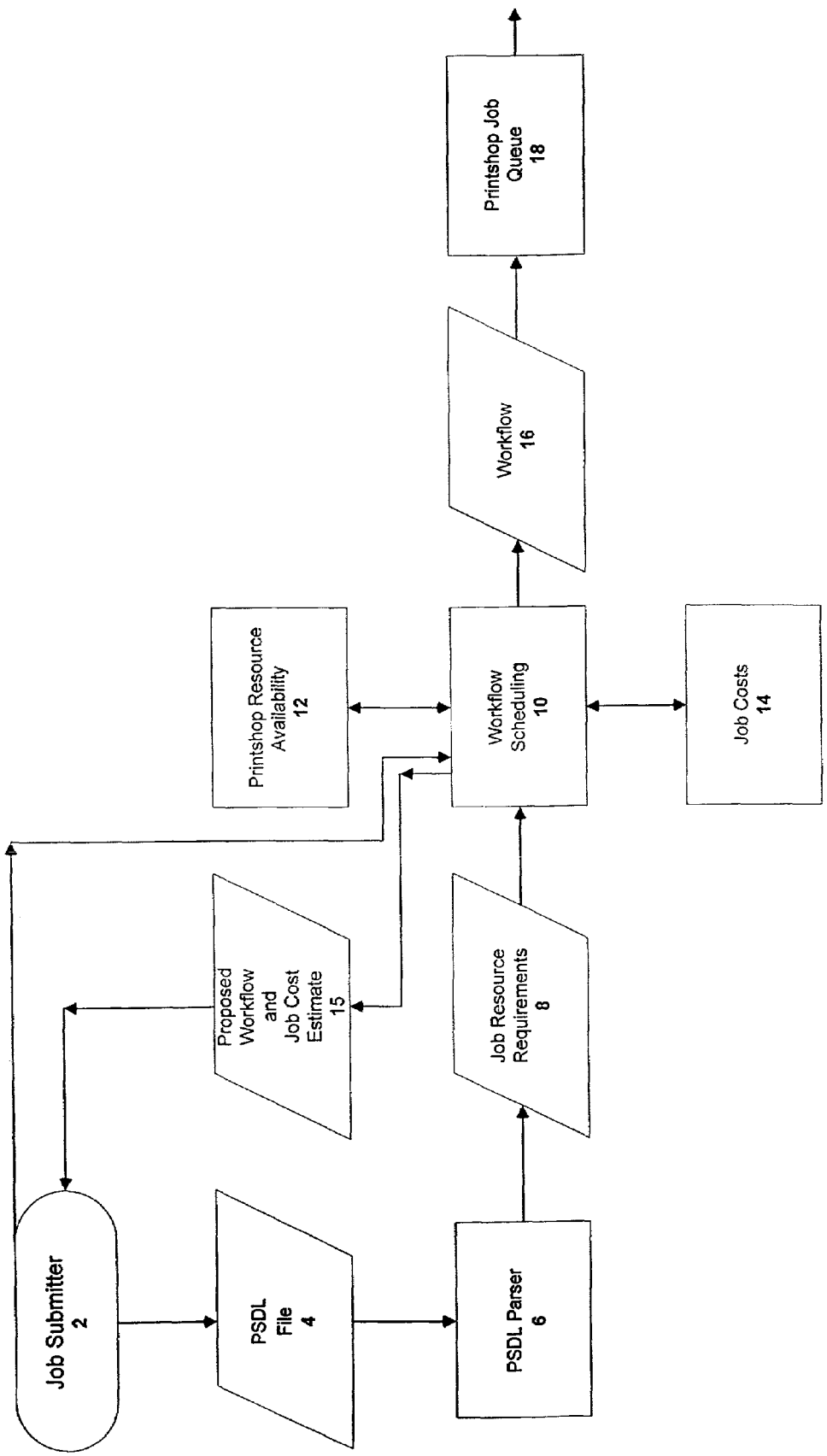
FIG. 1 is a block diagram of the modules used by the illustrated embodiment of the present invention.

FIG. 1 depicts component modules that are employed in the illustrated embodiment of the present invention. A job submitter 2 submits a print job stored in a PSDL file 4 to a computer system at a printshop. A PSDL parser 6 extracts the print job from the PSDL file 4 and separates the job resource requirements 8. The job resource requirements 8 are forwarded to the workflow scheduling module 10. The workflow scheduling module 10 compares the job resource requirements 8 that were extracted from the PSDL file 4 with the available printshop resources, machines, materials, and available labor listed in the printshop resource availability module 12 in order to generate a proposed workflow, schedule and job cost estimate 15. The cost to perform each step of the print job process is calculated using data contained in job costs module 14 to arrive at an estimated job cost. The proposed workflow, schedule and job cost estimate 15 are transmitted to the job submitter 2 for approval. If the job submitter accepts the proposed workflow, schedule and job cost estimate 15, the workflow 16 is forwarded to the printshop job queue 18 for processing. If the job submitter 2 rejects the proposed workflow and job cost estimate 15, the job submitter may propose substitutions of resources utilized in the print job, whereupon the workflow scheduler module 10 generates a new proposed workflow with and job cost estimate 15 in the same manner as before. The new proposed workflow and job cost estimate 15 are transmitted to the job submitter for approval 2. This process can iterate indefinitely until either the job submitter 2 approves of the proposed workflow and job cost estimate 15 or cancels the print job.

Figure 2:
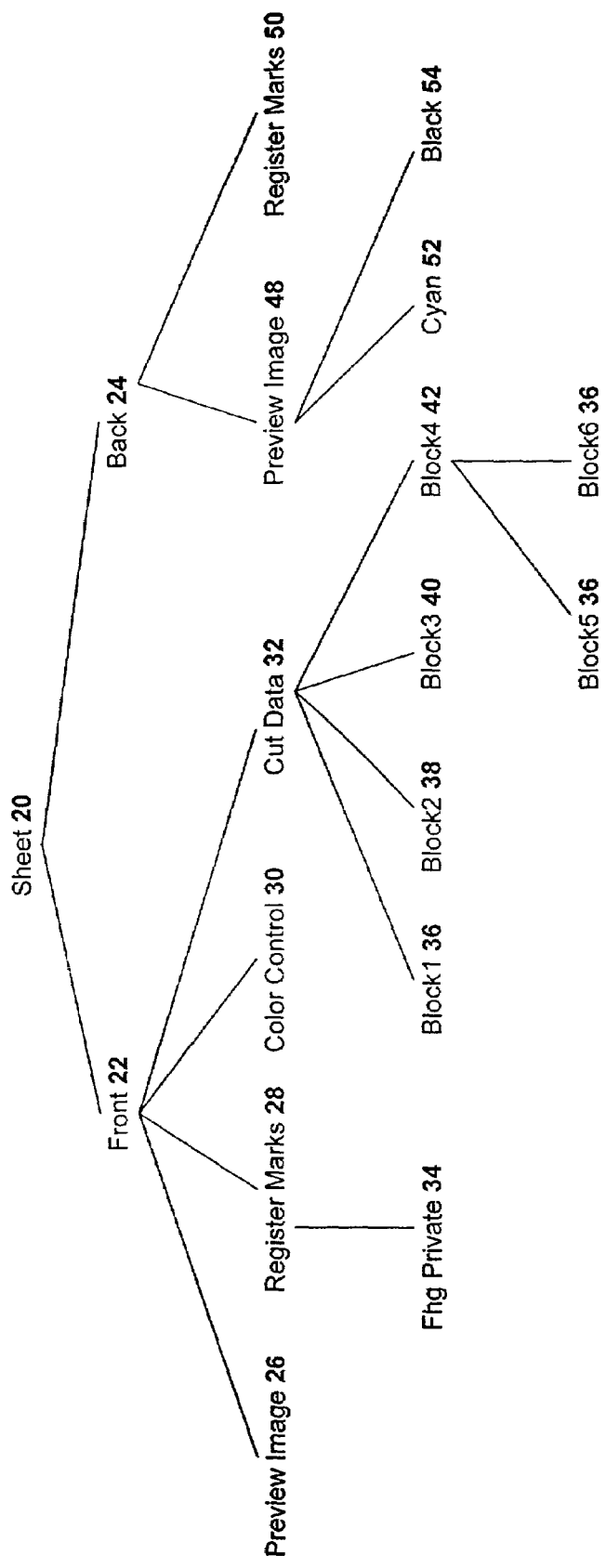
FIG. 2 is a block diagram of the hierarchical structure of a PPF file.

The print job submitted by the job submitter 2 is encapsulated in a printshop job description language format (PSDL) file. One such type of PSDL file is a print production format file (PPF). FIG. 2 depicts the hierarchical structure of one sheet of a print job stored in a PPF file. The tree-like structure of the sheet 20 is broken down into sub-components front 22 and back 24. The front 22 is broken down into sub-components preview image 26, which contains preview images for each color separation which are the basis for ink-key presetting on the press, register marks 28, which contains information regarding the correct orientation of the print media as it approaches the various machines of the printing process to undergo operations, color control 30, which contains information on the application of colored inks in the printing process, and cut data 32, which includes information on the required segmentation of the data. The register marks component 28 is further broken down into a sub-component Fhg private 34, which contains data on the finishing process, and the cut data component 32 which is broken down into four sub-components, block1, block2, block3, and block4 (36, 38, 40, 42). The block4 (42) sub-component is in turn broken down into two sub-components block5 (44) and block6 (46). Similarly, the back component 24 of the sheet 20 is divided into a preview image 48 and a register marks component 50. The preview image component 48 is further divided into a cyan component 52 and a black component 54 which contain information on cyan and black color separations respectively.

The different nodes of the tree-like structure depicted into FIG. 2 contain attributes holding information. The nodes work via an object-oriented inheritance mechanism whereby the child nodes are capable of inheriting the attributes of the parent nodes but maintain the ability to overwrite those attributes. Information that is stored in the attributes includes information such as information for administration, data for calculating the ink consumption, folding data, etc. Thus, an entire print job can be stored in the nodes of a PPF file. The PPF file contains all the information needed to conduct the print job, such as the type of ink to employ, the type of materials to use for paper or print media, the type of stitching to use, the machines required, etc. The PSDL parser 6 uses any of a number of well known tree spanning algorithms to extract the print job information from the nodes contained in the PSDL file 4. For example, the PSDL parser 6 may start at the root of the tree-like PPF file and travel down each branch to each leaf extracting information on the way, or, alternately, may start at the leaf and traverse the tree from the leaf to the root while extracting information from each node.

The PSDL parser 6 extracts the job resource requirements 8 from the PSDL file 4 storing the print job. The job resource requirements 8 for the print job are forwarded to the workflow scheduling module 10 to generate a workflow for the printshop. The workflow scheduling module 10 maintains contact with a printshop resource availability module 12 which contains the current resource availability of various resources in the printshop. For example, the printshop resource availability module 12 might indicate that an adequate supply of cyan ink was on hand for the print job but the supply of magenta ink was too low to begin production of a job requiring magenta ink. The workflow scheduling module 10 matches the job resource requirements 8 of the print job with the available resources of the printshop resource availability module 12 to produce a proposed workflow and job cost estimate 15. The proposed workflow organizes the processing of the print job into small discrete components. It also analyzes the interdependencies of each component. Each of the components of the proposed workflow is analyzed using the information contained in the job cost module 14 to generate an estimated job cost for that component of the print job. The estimates for all of the components are totalled together so as to form a total job cost estimate. The job cost estimate and proposed workflow 15 are then transmitted to the job submitter 2 for approval.

Figure 3A:
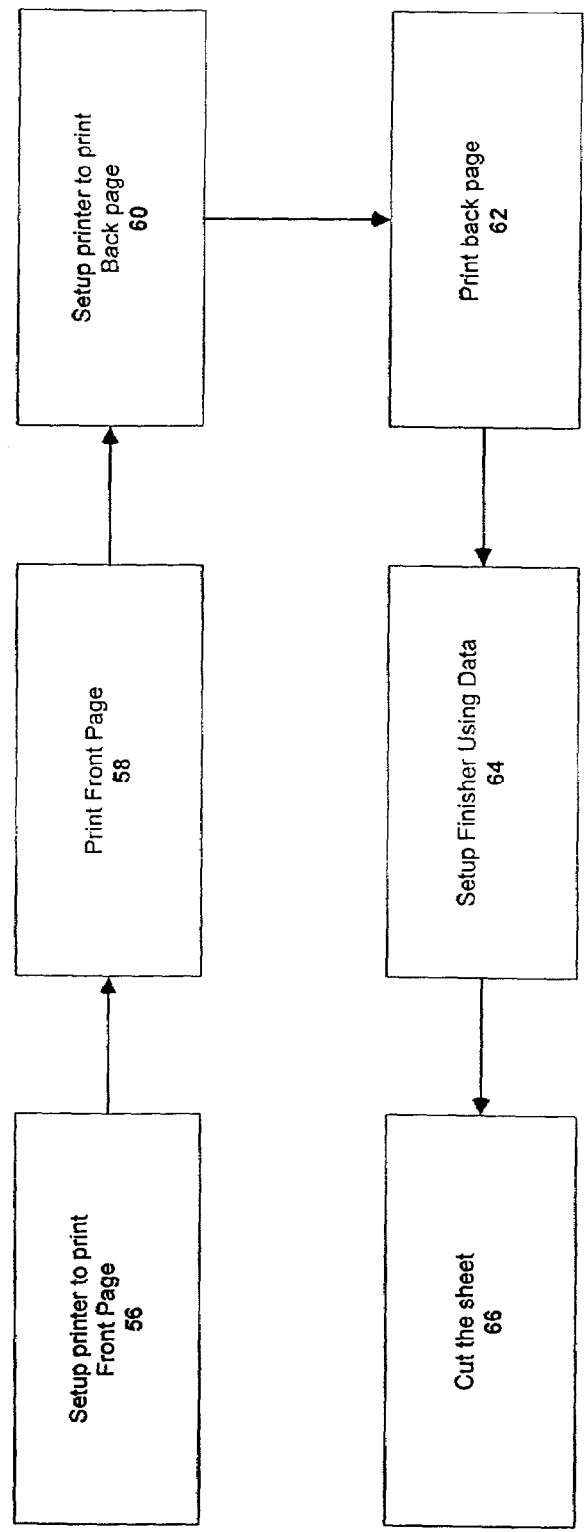
FIG. 3A is a flow chart of the operations produced by a workflow generated by the illustrated embodiment.

FIG. 3A depicts a workflow generated for producing the sheet 20 which was schematically described in FIG. 2. The workflow depicted requires the set up of a printer to print the front page (step 56). After the printer is set up, the front page is printed (step 58). Thereafter the printer is set up to print the back page (step 60) and the back page must be printed (step 62). In the next step, a finisher is set up using the data contained in the PPF file (step 64), and the sheet is finally cut and separated from the rest of printed print raw material (step 66).

Figure 3B:
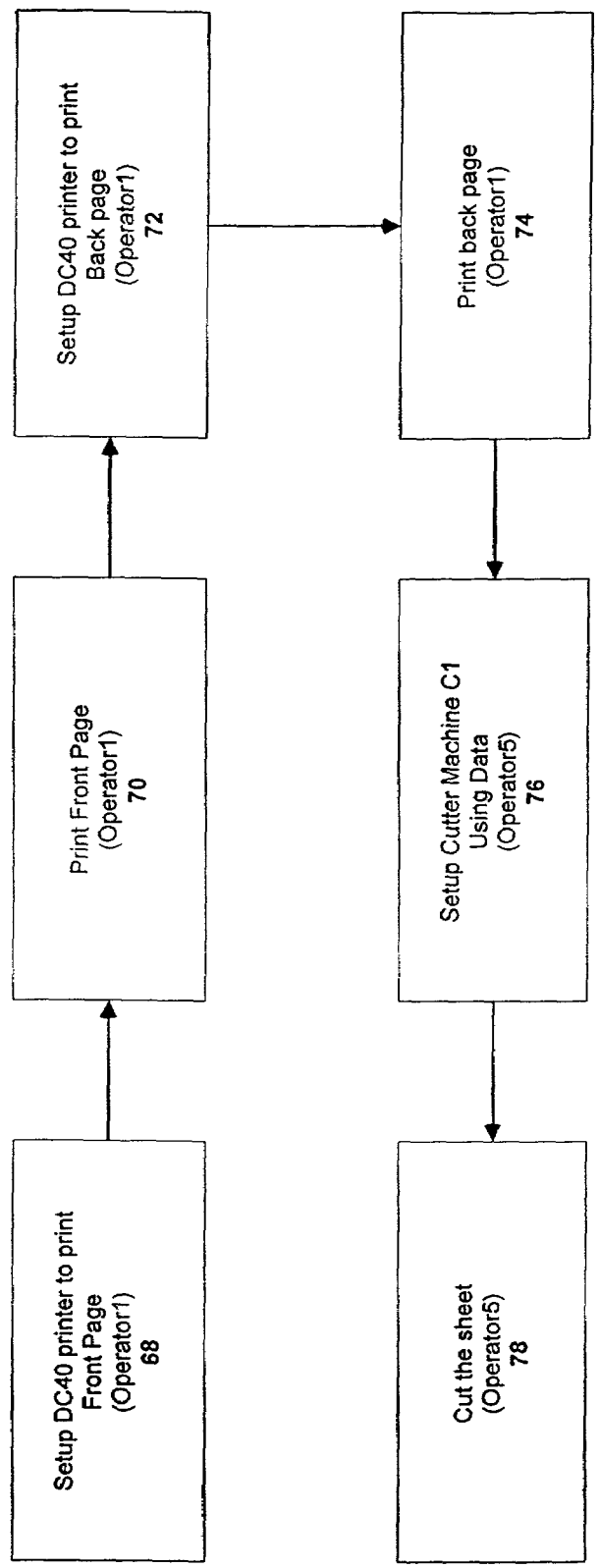
FIG. 3B is a flow chart of the workflow generated by the illustrated embodiment mapped through machines.

The workflow scheduling module 10 maps the sequence of steps required to perform the print job to the available machines and operators in the printshop as indicated by the printshop resource availability module 12. Thus, as depicted in FIG. 3B, a printer DC 40 operated by operator number 1 is set up to print the front page 22 (step 68). The front page 22 is printed by operator number 1 using the DC 40 printer (step 70). Similarly, the workflow sets up the DC 40 printer operated by operator number 1 to print the back page 24 (step 72), and the back page is then printed by operator number 1 using the DC 40 printer (step 74). The cutter machine C1, operated by operator number 5, is thereafter set up using data contained in the PPF file (step 76), and the sheet 20 is cut by operator number 5 using the C1 machine (step 78).

Once the workflow scheduling module has mapped the components of the print job to specific machines and operators and resources, the workflow scheduling module contacts the job cost module 14. The job cost module 14 contains information regarding the material costs in the printshop for the materials required for the print job, the labor costs for the operators required to run the machines, and information regarding the availability of the various machines required to perform the print job. The job cost module 14 also contains information regarding the speed and time required for the machines to perform various operations. For example, for a 500 sheet order with printing on the front and back of each sheet, if it costs 10 cents to print a front page (material costs), and 8 cents to print a back page (material costs), and the associated human operator cost is 10 cents a minute for printing operations (labor costs), and if the cost to cut and fold the paper is 2 cents a minute with an associated operator cost of 10 cents a minute (labor), and if the time required for the printing operations is 1hour and the time for the finishing operations (cutting and folding the paper) is ½ hour, the cost of producing the document would be $99.00 ((10 cents*500)+(8 cents*500)+ (10 cents*60)+(10 cents*30))=9900 cents=$99.00. The printshop may make use of the actual cost calculation by multiplying the actual cost by its required profit margin and passing the result onto the job submitter 2 as the job cost estimate that accompanies the proposed workflow 15.

Conventional printshops are organized in a fashion that is functionally independent of print job complexity, print job mix, and total volume of print jobs. Typically, related equipment is grouped together. Thus, all printing equipment is grouped and located in a single locale. Similarly, all finishing equipment is grouped and located in a single locale. In other words, conventional printshops organize resources into separate departments, where each department corresponds to a type of process or operation that is performed to complete a print job. When a print job arrives from a customer, the print job sequentially passes through each department. Once the print job is completely processed by a first department, the print job gets queued for the next department. This approach continues until the print job is completed. Unfortunately, this conventional approach leads to significant time delays and increased work-in-progress and inventory costs. The time gap between first output of a first department and the start of processing the print job in a second department may be thought of as a buffer space. The workflow generated by the illustrated embodiment of the present invention synchronizes the job requirements and available machine and labour resources in such a manner that the amount of buffer space between different machines in the printshop is kept an optimal level. An optimal buffer space is one in which the buffer space is large enough to allow the system to avoid gridlock in the event of a malfunction and small enough so that machine and operator idle time is minimized.

For example, if a print job of 500 sheets needed to be printed in a first department, cut in a second department and finished in a third department, the time between the end of printing the first sheet of the print job in the print department and the start of processing the 500 sheets as a group in the second department is the buffer space. Because the print job is processed as one entitity, the second department remains idle until the first department has finished all five hundred pages. The overall print job of 500 pages is broken down into smaller units, such as 50 sheets each, such that the second department can be performing cut operations on the first 50 sheets while the remaining 450 sheets are being printed. This pipelining of the print job processes results in less idle time for the machines (and their operators) and therefore more efficient and less expensive operations.

Once the workflow has been generated, the proposed workflow, schedule and the estimated job cost 15 are forwarded to the job submitter 2 by the workflow scheduling module 10. The job submitter 2 may decide that the proposed job cost is too expensive, and request a substitution of materials from the workflow scheduler module 10. In such an event, the workflow scheduling module 10 generates a new proposed workflow, schedule and a new estimated job cost 15 by consulting with the job cost module 14 and the printshop resource availability module 12 to determine the cost and availability of the requested substituted material. The new information is then transmitted to the job submitter 2. The illustrated embodiment may iterate through this cycle numerous times until the job submitter cancels the job or accepts the proposed workflow and job cost estimate 15. Once accepted, the print job workflow 16 is place in the printshop job queue 18 for execution.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps depicted in the figures may be altered without departing from the scope of the present invention and that the illustrations contained herein are singular examples of a multitude of possible depictions of the present invention.

We claim:

1. In a computer system, a method comprising the steps of: providing a PSDL parser capable of automatically, without user intervention, extracting print job requirements from a PSDL file; automatically, without user intervention, creating a proposed workflow for a printshop using said print job requirements extracted by said PSDL parser and resource knowledge recording resources in said printshop; wherein said resource knowledge includes information regarding job costs and availability in said printshop of available machines, machine operators, work-in-progress and inter-process storage buffer levels and materials required to process said print job.

2. The method of claim 1 wherein said proposed workflow is used to generate a job cost estimate.

3. The method of claim 2 wherein said job cost estimate includes material costs and labor costs.

4. The method of claim 3 wherein said proposed workflow and said job cost estimate are transmitted to a job submitter that submitted the print job for approval prior to processing said print job.

5. The method of claim 4, further comprising the steps of:
said job submitter substituting new materials to replace materials included in said proposed workflow;

creating a new proposed workflow which includes said new materials;
generating a new job cost estimate for said new proposed workflow; and
transmitting said new job cost estimate and said new proposed workflow to said job submitter for approval.

6. The method of claim 4, further comprising the steps of:
said job submitter substituting new machines to replace machines included in said proposed workflow;
creating a new proposed workflow which includes said new machines;
generating a new job cost estimate for said new proposed workflow; and
transmitting said new job cost estimate an said new proposed workflow to said job submitter for approval.

7. The method of claim 4, further comprising the steps of:
said job submitter substituting new machine operators to replace operators included in said proposed workflow;
creating a new proposed workflow which includes said new machine operators;
generating a new job cost estimate for said new proposed workflow; and
transmitting said new job cost estimate an said new proposed workflow to said job submitter for approval.

8. The method of claim 1, wherein said PSDL file is a Print Production Format (PPF) file.

9. The method of claim 1, wherein said PSDL file is a JDF file.

10. The method of claim 1, wherein said PSDL file is a PCX file.

11. In a computer system, a method comprising the steps of:
submitting a print job to a printshop having resources, said print job stored in a printshop job description language (PSDL) file;
automatically, without user intervention, extracting print job requirements from said PSDL file;
comparing said print job requirements, including material and labor requirements, from said PSDL file against available resources, status of the work-in-progress, current schedule and available materials in the printshop; and
automatically, without user intervention, creating a proposed workflow for said printshop from said print job requirements and from printshop resource knowledge resources, said proposed workflow dividing said print job into components and mapping said components of said print job to available resources of said printshop so as to set buffer space between machines to optimal levels while processing said print job.

12. The method of claim 11 further comprising the step of:
executing said print job in said printshop using said proposed workflow.

13. The method of claim 11 wherein said resource knowledge includes information regarding job costs and availability in said printshop of machines, machine operators and materials used in processing said print job.

14. The method of claim 11 wherein said resource knowledge further includes information regarding operational speed and capacity of machines in said printshop used in processing said print job.

15. A computer executable medium for use with a computer system, said medium holding computer-executable instructions for a method, said method comprising the steps of;
submitting a print job to a printshop having resources, said print job stored in a printshop job description language (PSDL) file;
automatically, without user intervention, extracting print job requirements from said PSDL file;
automatically, without user intervention, comparing said print job requirements against available resources, work-in-progress, current schedule and available materials in the printshop; and
automatically, without user intervention, creating a proposed workflow for said printshop, said proposed workflow dividing said print job into components and mapping said components of said print job to available resources of said printshop so as to set the-buffer space between machines to optimal levels while processing said print job.

* * * * *